No. 674,890. Patented May 28, 1901.
H. E. & H. F. WAITE.
STATIC MACHINE.
(Application filed Apr. 10, 1901.)
(No Model.)

UNITED STATES PATENT OFFICE.

HENRY E. WAITE AND HARRY F. WAITE, OF NEW YORK, N. Y.

STATIC MACHINE.

SPECIFICATION forming part of Letters Patent No. 674,890, dated May 28, 1901.

Application filed April 10, 1901. Serial No. 55,230. (No model.)

*To all whom it may concern:*

Be it known that we, HENRY E. WAITE and HARRY F. WAITE, citizens of the United States, residing in the city of New York, in the county of New York and State of New York, have invented certain new and useful Improvements in Static Machines, of which the following is a specification.

Our invention relates to influence-machines, and more particularly to an improved means for charging them. While it has been customary to provide an initial charge on an influence-machine for exciting it, and this by means of an auxiliary charging-machine, the usual manner of placing the charging-machine inside of the casing of the influence-machine to be charged has proved an awkward arrangement, filling much space and interfering with the convenient adjustments of both the influence-machine and the charging-machine.

One of our improvements consists in placing the charging-machine upon one of the removable doors of the air-tight casing, so that it may be removed with the door. By this arrangement both machines may be readily and conveniently adjusted and cleaned. Furthermore, since the casing should be air-tight for the best results and it is usual to provide the doors with special arrangements to aid in accomplishing this purpose, as with washers and packings, by placing the charging-machine upon a removable door there is no interference with the packing and joints of the casing, for formerly it was necessary to remove the charging-machine from its place upon the casing to adjust it; but in our arrangement the charging-machine is not removed from the casing, but is removed with a part of it, so that its relation to the casing always remains the same. This therefore allows of nice adjustment at the air-tight joints between a door and the casing without regard to the relative position of the charging-machine.

We have also provided improved connections between the charging-machine and the working machine to be charged, whereby the most effective and certain effects are obtained with the least complexity of apparatus.

Figure 1:
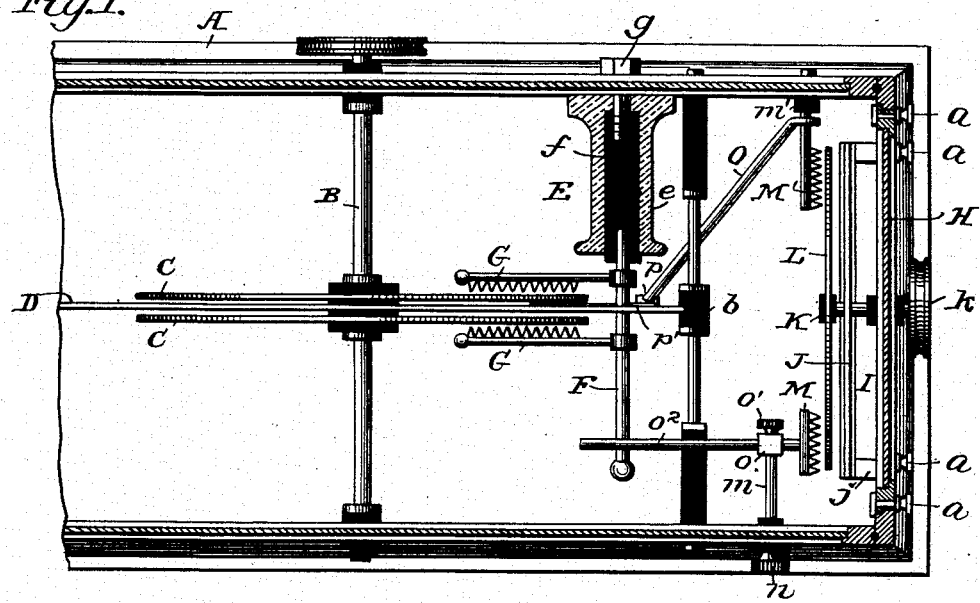
Figure 2:
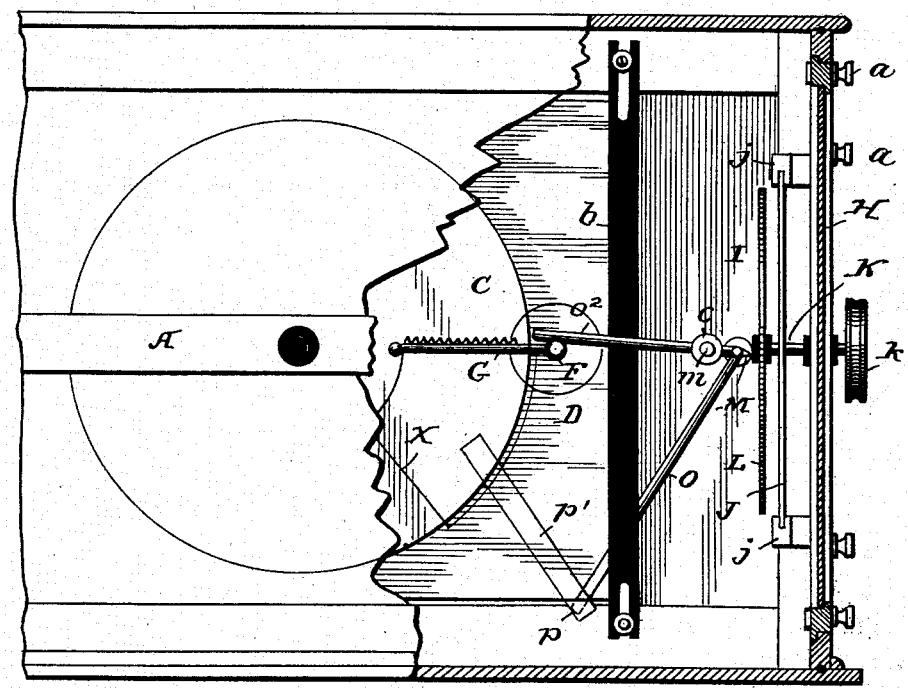

In the accompanying drawings, illustrating our invention, Figure 1 is a plan view, partly cut away, of a machine embodying our improvements. Fig. 2 is a side elevation, partly cut away, of the same.

Referring to the drawings, A represents the casing of an influence-machine of any suitable character; but we have shown one made in accordance with United States Patent No. 497,226, granted May 9, 1893, to H. E. Waite. The casing is shown with provisions for excluding air and dust and an arrangement of removable doors, substantially as shown and described in the patent above referred to.

B represents a revoluble shaft journaled in the casing and carrying revoluble disks C C, of glass, of which there may be any suitable number; but for simplicity's sake and as merely illustrative of our improvement we have shown but two disks.

D is a stationary plate between the disks and supported by suitable strips $b$.

E is an insulating-support of suitable character for supporting the rod which carries the collecting-combs of the influence-machine, and we have shown this support as made in accordance with United States Patent No. 668,300, granted February 19, 1901, to H. E. Waite for an "insulating-support for electrical conductors."

$e$ is an insulating-socket, preferably of glass, having embedded in it a piece of hard rubber $f$ with screw-threaded sockets, one of which is adapted to hold the end of the rod F and the other is adapted to receive the end of the supporting-screw $g$, which passes through the casing. The comb-collectors G are then suitably clamped to the rod F.

While we have shown but one door H, it should be understood that the casing contains such a removable door H at each end, that they are similar in construction, and that but one will be described. The door is mortised so as to fit closely and the joints are provided with suitable gaskets, preferably of soft rubber or felt, and they are further secured by means of milled screws $a$, by means of which the parts can be brought closely together, so as to make a practically air-tight joint, the ends consisting, preferably, of a frame inclosing a glass plate secured by putty.

Upon the central framing I is secured the charging-machine, which may be of any suitable character; but we have shown it as consisting of a stationary plate J, supported from the framing I by a strip $j$. The framing I also carries a spindle K and a revoluble disk L inside of the case, with a pulley $k$ outside of the case. Comb-collectors M M' are provided for the charging-machine, the collector M' being fastened to the casing by an insulating-support $m'$, while the comb-collector M is supported from the casing by an insulated rod $m$, carrying a button $n$ outside the case, so that the rod $m$ may be rotated. The comb-collector M is secured to the rod $m$ in any suitable manner; but we have shown it fastened to a socket $o$, carrying a clamping-screw $o'$, while also extending from the socket $o$ is a rod $o^2$ of conducting material, which is adapted to be placed in contact with the rod F, which supports the comb-collectors G of the working machine. An adjustable conductive connection is also made in any suitable manner between the other comb-collector M' of the charging-machine and the stationary plate D, this connection being shown by a rod O, the end $p$ of which is adapted to connect with the plate D. The end $p$ of the connector O is shown in Fig. 2 as connecting with a conducting-strip $p'$ in contact with an armature X, which may be of paper, upon the stationary plate D. The arrangement of the connector and conducting-strip $p'$ is such that the connector may be placed in and out of contact with the conducting-strip at will, and it is also obvious that by the construction described of the conducting-rod $o^2$ this rod may also be placed in contact with the rod F and removed therefrom at will.

In charging the working influence-machine the connector O is placed in contact with the conducting-strip $p'$, and the conducting-rod $o^2$ is placed in contact with the rod F, carrying the combs G, and the revolving plate L of the charging-machine is set in rotation. It is obvious that a charge will be given to the armature X on the plate D and a charge will also be given to the combs G, which will in turn influence the revolving plates C. Having given this initial charge to the working machine, it will build up, as usual, and the connections between the charging-machine and the influence-machine may be removed.

It is obvious that the herein-described arrangement of charging-machine and its connections for charging the influence-machine afford many advantages, the principal of which have been pointed out.

Without limiting ourselves to the precise details of construction shown and described, we claim, and desire to obtain by Letters Patent, the following:

1. In an influence-machine, the combination, with a casing, of a removable door therefor, carrying a charging-machine, adapted to be removed with the door, substantially as described.

2. The combination with the stationary plates, rotating disks and collecting-combs of an influence-machine, of a casing therefor having a removable door carrying a charging-machine, and connections between the charging-machine and the influence-machine, substantially as described.

3. The combination with the stationary plates, rotating disks and collecting-combs of an influence-machine, of a casing therefor, a removable door in the casing carrying a charging-machine, and connection between the charging-machine and a stationary plate and a collecting-comb of the influence-machine, substantially as described.

4. The combination with the stationary plates, rotating disks and collecting-combs of an influence-machine, of a casing therefor having a removable door carrying a charging-machine, an adjustable connection between a collecting-comb of the charging-machine and an armature on a stationary plate of the influence-machine, and an adjustable connection between another collecting-comb of the charging-machine and a collecting-comb of the influence-machine, substantially as described.

5. The combination with an influence-machine, of a charging-machine and adjustable connections between the two, substantially as set forth.

In testimony whereof we have signed our names to this specification in the presence of two subscribing witnesses.

HENRY E. WAITE.
HARRY F. WAITE.

Witnesses:
FREDERIC C. BARTLETT,
FREDERICK S. ROGERS.